(12) United States Patent
Wang et al.

(10) Patent No.: US 7,185,858 B2
(45) Date of Patent: Mar. 6, 2007

(54) SPACECRAFT GYRO CALIBRATION SYSTEM

(75) Inventors: Hangching Grant Wang, Hacienda Heights, CA (US); Rongsheng K Li, Hacienda Heights, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/723,782

(22) Filed: Nov. 26, 2003

(65) Prior Publication Data

US 2005/0108884 A1 May 26, 2005

(51) Int. Cl.
G01C 17/38 (2006.01)
G06F 15/00 (2006.01)

(52) U.S. Cl. .................................................. 244/171
(58) Field of Classification Search ............. 244/158.1, 244/158.4, 158.5, 158.6, 164, 171; 73/178; 318/580–590; 701/3–20
See application file for complete search history.

(56) References Cited

U.S. PATENT DOCUMENTS

| | | | | | |
|---|---|---|---|---|---|
| 3,242,744 | A | * | 3/1966 | Fischel ........................ 74/5.34 |
| 4,094,479 | A | * | 6/1978 | Kennedy, Jr. ................ 244/179 |
| 4,303,978 | A | * | 12/1981 | Shaw et al. .................. 701/220 |
| 4,732,354 | A | * | 3/1988 | Lievre ......................... 244/170 |
| 5,140,525 | A | * | 8/1992 | Shankar et al. ............. 701/226 |
| 5,205,518 | A | * | 4/1993 | Stetson, Jr. .................. 244/165 |
| 5,400,033 | A | * | 3/1995 | Hablani ........................ 342/95 |
| 5,402,341 | A | * | 3/1995 | Liubakka et al. ............. 701/42 |
| 5,452,869 | A | * | 9/1995 | Basuthakur et al. ......... 244/164 |
| 5,527,003 | A | * | 6/1996 | Diesel et al. ................ 244/195 |
| 5,574,650 | A | * | 11/1996 | Diesel ......................... 701/220 |
| 5,826,828 | A | * | 10/1998 | Fowell et al. ................ 244/164 |
| 6,260,805 | B1 | * | 7/2001 | Yocum et al. ............... 244/164 |
| 6,421,622 | B1 | * | 7/2002 | Horton et al. ................ 702/95 |
| 6,647,352 | B1 | * | 11/2003 | Horton ........................ 702/151 |
| 6,804,986 | B2 | * | 10/2004 | Patouraux .................... 73/1.78 |
| 6,853,947 | B1 | * | 2/2005 | Horton ........................ 702/151 |
| 6,863,244 | B2 | * | 3/2005 | Fowell et al. ................ 244/171 |
| 6,921,049 | B2 | * | 7/2005 | Fowell ......................... 244/164 |
| 2002/0116993 | A1 | * | 8/2002 | Patouraux .................... 73/178 R |
| 2004/0113020 | A1 | * | 6/2004 | Wang et al. .................. 244/165 |
| 2004/0117074 | A1 | * | 6/2004 | Wang et al. .................. 701/13 |
| 2005/0027407 | A1 | * | 2/2005 | Holt et al. ...................... 701/4 |
| 2005/0049764 | A1 | * | 3/2005 | Wang et al. .................. 701/13 |
| 2005/0108884 | A1 | * | 5/2005 | Wang et al. .................. 33/328 |
| 2005/0178874 | A1 | * | 8/2005 | Wang et al. ................ 244/3.16 |

OTHER PUBLICATIONS

M. Annadurai, "Innovations in Satellite Mission Management", pp. 1-10 (and wayback attachment), Nov. 23, 2004.*

* cited by examiner

*Primary Examiner*—Michael J. Carone
*Assistant Examiner*—Stephen A Holzen
(74) *Attorney, Agent, or Firm*—Ostrager Chong Flaherty & Broitman PC (57) ABSTRACT

A method of calibrating a gyro (42) of a spacecraft (14) may include determining a yaw attitude residual of the spacecraft. Roll gyro bias residual is determined in response to the yaw attitude residual. The gyro (42) is calibrated in response to the roll gyro bias residual. A method of calibrating a gyro (42) of a spacecraft (14) may alternatively include disabling gyro calibration, gain scheduling, or resetting attitude and gyro bias covariance, for selective axes, for a yaw transient period. The gyro (42) is calibrated in a nominal fashion after completion of the yaw transient period.

24 Claims, 3 Drawing Sheets

SPACECRAFT GYRO CALIBRATION SYSTEM

TECHNICAL FIELD

The present invention is related generally to satellite sensor calibration systems. More particularly, the present invention is related to a system and method of calibrating gyro sensors of a spacecraft.

BACKGROUND OF THE INVENTION

In general, many current spacecrafts operate with zero momentum bias and use a stared thermostatic earth sensor assembly (STESA) or beacon and a gyro for on-station attitude determination. The earth sensor provides absolute roll and pitch attitude measurements for attitude update and gyro calibration, and the gyro provides relative roll, pitch and yaw attitude information. A sun sensor assembly (SSA) is utilized for providing absolute yaw measurement for attitude update and calibration of the gyro.

Each orbit period of a spacecraft orbit is operationally subdivided into two time durations: one is referred to as "gyro calibration" and the other is referred to as "gyro compassing". During gyro calibration, 3-axis attitude measurements are used to calibrate the gyro and update the spacecraft attitude. The measurement data collected from the earth sensor and the SSA provide a 3-axis attitude update, which is also used to calibrate the gyro bias, and other gyro parameters. Gyro calibration occurs during approximately 4 hours of the day, which is when the sun is in the field-of-view (FOV) of the SSA and a good geometric dilution factor exists for accurate attitude determination by the SSA.

During gyro compassing, which generally occurs for approximately the remainder 20 hours of the day, 2-axis attitude measurements are used to estimate the spacecraft attitude. The earth sensor provides a 2-axis attitude update that includes roll and pitch measurements. The roll gyro sensor is used to estimate the yaw attitude by gyro compassing. Yaw attitude estimation is generally not precise and has associated yaw attitude error that increases over time due to roll gyro drift.

The yaw attitude error is often accounted for and corrected when the sun comes into FOV of the SSA. The resulting total yaw error accumulated during gyro compassing, which is the difference between the yaw attitude measured by the sun sensor and the yaw attitude determined by gyro compassing, is detected and a large estimated yaw attitude error signal is generated in response thereto. The duration of the large yaw attitude error signal is referred to as the yaw transient period. This yaw error accumulated during gyro compassing is erroneously used to calibrate the yaw gyro bias and causes undesirable transient in yaw gyro bias estimation. The erroneous yaw gyro bias also propagates over time into an undesirable yaw error until the yaw gyro bias converges back to its correct yaw gyro bias. Through attitude estimation and gyro calibration procedures the yaw attitude is corrected over a considerable amount of time.

Also, the yaw axis of the spacecraft is orbit-rate-coupled to the roll axis such that the large yaw error causes a significant roll error during the yaw transient period. The roll error causes the roll gyro bias to be calibrated incorrectly. As with the yaw attitude, it also requires a considerable amount of time to converge back to the correct roll gyro bias value.

In addition, given the limited time of sun in the FOV of the SSA, the roll gyro bias may not fully converge to the optimal roll gyro bias value. In other words, a small amount of error remains in the corrected roll gyro bias when the spacecraft switches to the gyro compassing. This is especially true when the period that the sun is in the FOV is not long enough with respective to the gyro calibration time constant. Everyday this undesirable yaw error transient is repeated, which persistently degrades the spacecraft pointing in gyro compassing.

Furthermore, it is inherently difficult to provide a clear FOV of 120° by 120° for a wide FOV SSA, due to the intrusion or blockage from other spacecraft components, such as antenna reflectors, thermal radiators, and solar wings, especially tilted solar wings. This further reduces the amount of usable time that is available, when the sun is in the FOV, for gyro calibration. Notwithstanding, a desired quality level of the geometric dilution factor needs to be maintained for this reduced amount of time. Thus, the available gyro calibration time is reduced and quality of the gyro calibration is degraded.

Moreover, gyro calibration is currently performed at one thermal condition corresponding to the thermal distortion between the earth sensor and the sun sensor for a small section of the orbit of the spacecraft, while gyro compassing is performed under other thermal conditions for the remainder of the orbit. Roll gyro bias is calibrated to account for the diurnal thermal deformation of when the sun is in the FOV of the SSA. The diurnal thermal deformation negatively affects yaw pointing of the spacecraft during gyro compassing. As a result, the calibrated roll gyro bias never satisfies the thermal conditions experienced during gyro compassing and the yaw error never converges to zero.

What is more, the spacecraft may operate in an SSA failure mode that can cause the spacecraft to loose fine mode data in turn causing the spacecraft to operate in a coarse mode. The coarse mode can be insufficiently accurate for attitude determination and gyro calibration.

Thus, there exists a need for an improved satellite attitude estimation and gyro calibration system that minimizes yaw attitude estimation error during gyro compassing, that utilizes a minimal amount of calibration time, that accounts for varying thermal conditions experienced during orbit of a spacecraft, and that can utilize SSA measurements in a coarse mode.

SUMMARY OF THE INVENTION

The present invention provides methods of calibrating a gyro of a spacecraft. In one method embodiment of the present invention, yaw attitude residual of the spacecraft is determined. Roll gyro bias error is determined in response to the yaw attitude residual. The gyro is calibrated in response to the roll gyro bias error.

In a second method embodiment of the present invention, a gyro calibration procedure is disabled selectively for each axis, gain scheduling is performed selectively for each axis, or an attitude and a gyro bias covariance is reset selectively for each axis, for a yaw transient period. The gyro is calibrated in a nominal way after completion of the yaw transient period.

The embodiments of the present invention provide several advantages. One such advantage that is provided by an embodiment of the present invention is the provision of determining roll gyro bias in response to a yaw attitude residual and calibrating the gyro in response thereto. The stated embodiment minimizes yaw attitude error and accounts for thermal deformation during gyro compassing.

Other advantages that are provided by multiple embodiments of the present invention are the provisions of disabling gyro calibration, adjusting attitude update gain and gyro bias update gain, or resetting attitude covariance and gyro bias covariance, selectively for each axis, during the yaw transient period. In so doing, the stated embodiments also minimize yaw transient period and avoid corruption of roll gyro bias estimation.

Another advantage that is provided by the present invention is the minimization of the desired calibration time of a gyro.

Yet another advantage that is provided by an embodiment of the present invention is the provision of updating roll gyro bias such that inaccuracies due to sun sensor assembly in coarse mode becomes acceptable.

The present invention itself, together with further objects and attendant advantages, will be best understood by reference to the following detailed description, taken in conjunction with the accompanying drawing.

LIST OF SYMBOLS

| | |
|---|---|
| $\theta_i$ | Spacecraft attitude for i axis. |
| $b_i$ | Gyro bias for i axis. |
| $b_{est}$ | Estimated gyro bias. |
| $b_t$ | True gyro bias. |
| $\delta\theta_i$ | Attitude estimation error for i axis. |
| $\delta b_i$ | Gyro bias estimation error. |
| $\delta\dot{\theta}_i$ | Change rate in attitude estimation error. |
| $\delta\dot{b}_i$ | Change rate in gyro bias estimation error. |
| $\omega_i$ | Spacecraft angular rate for i axis. |
| $\omega_m$ | Measured spacecraft rate. |
| $\omega_t$ | True spacecraft rate. |
| $\overline{\omega}_t$ | Mean value of $\omega_t$ over an orbit. |
| $\tilde{\omega}_t$ | Variation of $\omega_t$. |
| $k_{\theta i}^{bi}$ | Kalman filter gyro bias update gain from attitude error. |
| $n_{\theta i}$ | Attitude measurement noise for i axis. |
| ARWi | Angle random walk for i gyro. |
| RRWi | Rate random walk for i gyro. |
| $S_{1i}^{cal}$ | Combination of gyro scaling factor and misalignment error. |
| $\overline{S}_{1i}^{cal}$ | Mean value of $S_{1ical}$. |
| $\tilde{S}_{1i}^{cal}$ | Variation of $S_{1ical}$. |
| I | Identity matrix. |

LIST OF SYMBOLS

| | |
|---|---|
| i | Constant from 1–3, referring to roll, pitch, and yaw, respectively. |

DETAILED DESCRIPTION

A common gyro calibration technique used when full 3-axis attitude measurements are valid, is referred to as a 3-axis continuous calibration. During a 3-axis continuous calibration the yaw attitude error $\delta\theta_3$ are often used to update the yaw gyro bias $\delta b_3$. The yaw attitude error $\delta\theta_3$ is the difference between the yaw attitude data, collected from a gyro, and the yaw attitude data, collected from a sun sensor. Similarly, roll attitude error $\delta\theta_1$ is used to update roll gyro bias $\delta b_1$. This is shown by dynamic equation 1, which represents gyro calibration errors during gyro calibration. Equation 1 has a steady state solution.

$$\begin{bmatrix} \delta\dot{\theta}_1 \\ \delta\dot{\theta}_2 \\ \delta\dot{\theta}_3 \\ \delta\dot{b}_1 \\ \delta\dot{b}_2 \\ \delta\dot{b}_3 \end{bmatrix} = \begin{bmatrix} -k_{\theta 1}^{\theta 1} & \omega_3 & -\omega_2 & -1 & 0 & 0 \\ -\omega_3 & -k_{\theta 2}^{\theta 2} & \omega_1 & 0 & -1 & 0 \\ \omega_2 & -\omega_1 & -k_{\theta 3}^{\theta 3} & 0 & 0 & -1 \\ k_{\theta 1}^{b1} & 0 & 0 & 0 & 0 & 0 \\ 0 & k_{\theta 2}^{b2} & 0 & 0 & 0 & 0 \\ 0 & 0 & k_{\theta 3}^{b3} & 0 & 0 & 0 \end{bmatrix} \begin{bmatrix} \delta\theta_1 \\ \delta\theta_2 \\ \delta\theta_3 \\ \delta b_1 \\ \delta b_2 \\ \delta b_3 \end{bmatrix} + \begin{bmatrix} -ARW1 - k_{\theta 1}^{\theta 1}n_{\theta 1} - \sum S_{1i}\omega_i \\ -ARW3 - k_{\theta 2}^{\theta 2}n_{\theta 2} - \sum S_{2i}\omega_i \\ -ARW3 - k_{\theta 3}^{\theta 3}n_{\theta 3} - \sum S_{3i}\omega_i \\ k_{\theta 1}^{b1}n_{\theta 1} + RRW1 \\ k_{\theta 2}^{b2}n_{\theta 2} + RRW2 \\ k_{\theta 3}^{b3}n_{\theta 3} + RRW3 \end{bmatrix} \quad (1)$$

Gyro compassing is used to determine yaw attitude when roll and pitch attitude measurements are valid while yaw attitude measurement from SSA is not available. In gyro compassing, by orbit-rate-coupling of the spacecraft yaw axis with the spacecraft roll axis, the accuracy of the yaw attitude estimation depends on the accuracy of the roll gyro bias estimation and the stability of the roll gyro bias. The roll gyro bias is maintained at a constant during gyro compassing to determine the yaw attitude. A constant roll gyro bias error $\delta b_1^{cal}$ is determined during calibration of the gyro and is used to determine the yaw attitude estimation error $\delta\theta_3$ during gyro compassing, which is represented by equations 2–7.

$$\delta b_1^{cal} = -\sum S_{1i}^{cal} \omega_i^{cal} \quad (2)$$
$$= -(S_{11}\omega_1 + S_{12}\omega_2 + S_{13}\omega_3)$$

$$\delta b_1^{cal} = -(\overline{S}_{11}\overline{\omega}_1 + \overline{S}_{12}\overline{\omega}_2 + \overline{S}_{13}\overline{\omega}_3) - \quad (3)$$
$$(\overline{S}_{11}\overline{\omega}_1 + \overline{S}_{12}\tilde{\omega}_2 + \overline{S}_{13}\tilde{\omega}_3) -$$
$$(\tilde{S}_{11}\overline{\omega}_1 + \tilde{S}_{12}\overline{\omega}_2 + \tilde{S}_{13}\overline{\omega}_3)$$

$$S_{1i} = \overline{S}_{1i} + \tilde{S}_{1i} \quad (4)$$

-continued $$\omega_{1i} = \overline{\omega}_{1i} + \tilde{\omega}_{1i} \quad (5)$$

$$\begin{bmatrix} \delta\dot{\theta}_1 \\ \delta\dot{\theta}_2 \\ \delta\dot{\theta}_3 \\ \delta\dot{b}_1 \\ \delta\dot{b}_2 \\ \delta\dot{b}_3 \end{bmatrix} = \begin{bmatrix} -k_{\theta 1}^{\theta 1} & \omega_3 & -\omega_2 & -1 & 0 & 0 \\ -\omega_3 & -k_{\theta 2}^{\theta 2} & \omega_1 & 0 & -1 & 0 \\ \omega_2 - k_{\theta 1}^{b3} & -\omega_1 & 0 & 0 & 0 & -1 \\ 0 & 0 & 0 & 0 & 0 & 0 \\ 0 & k_{\theta 2}^{\theta 2} & 0 & 0 & 0 & 0 \\ k_{\theta 1}^{b3} & 0 & 0 & 0 & 0 & 0 \end{bmatrix} \begin{bmatrix} \delta\theta_1 \\ \delta\theta_2 \\ \delta\theta_3 \\ \delta b_1 \\ \delta b_2 \\ \delta b_3 \end{bmatrix} + \quad (6)$$

$$\begin{bmatrix} -ARW1 - k_{\theta 1}^{\theta 1} n_{\theta 1} - \sum \delta S_{1i}\omega_i \\ -ARW3 - k_{\theta 2}^{\theta 2} n_{\theta 2} - \sum \delta S_{2i}\omega_i \\ -ARW3 - k_{\theta 3}^{\theta 3} n_{\theta 3} - \sum \delta S_{3i}\omega_i \\ RRW1 \\ k_{\theta 2}^{b2} n_{\theta 2} + RRW2 \\ k_{\theta 3}^{b3} n_{\theta 3} + RRW3 \end{bmatrix}$$

$$\delta\theta_3 = \frac{-\delta b_1^{cal} - (S_{11}\omega_1 + S_{12}\omega_2 + S_{13}\omega_3)}{\omega_2} \quad (7)$$

Equation 2 represents the constant roll gyro bias estimation error $\delta b_1^{cal}$ via gyro calibration and maintains constant during gyro compassing. The roll gyro bias error $\delta b_1^{cal}$ is equal to the product summation of the combination of the gyro scaling factor and misalignment error $S_{1i}^{cal}$ and the spacecraft angular rate $\omega_i$, as expressed in equations 3–5. Equation 6 represents attitude and gyro bias errors during gyro compassing. Equation 6 also has a steady state solution.

Yaw estimation error persists due to the difference in optimal gyro bias estimates between the calibration period and the compassing period, which in turn is due to differences in spacecraft rate, gyro misalignment, gyro bias, and gyro scaling factor, between the calibration period and the compassing period.

A Kalman filter is commonly utilized to account for the thermal deformation during gyro calibration and gyro compassing. Unfortunately since roll gyro bias is fixed during the gyro compassing period and its corresponding thermal deformation is at the gyro calibration period, the Kalman filter is incapable in accounting for the thermal condition differences experienced between gyro calibration and gyro compassing without a large thermal model.

Gyro alignment error differences exist between the calibration period and the compassing period due to different variations in mechanical mounting and gyro related parameters. The alignment errors can result from thermal deformation and variations in gyro electrical alignment and scaling factors. The errors can result also from a variation in spacecraft rotation rate. The relationship between gyro bias and the gyro related parameters are shown in equations 8–10.

$$\omega_m = (I + \overline{S} + \tilde{S})(\overline{\omega}_t + \tilde{\omega}_t) + b_t + ARW \quad (8)$$

$$b_{est} = (\overline{S} + \tilde{S})(\overline{\omega}_t + \tilde{\omega}_t) + b_t \quad (9)$$

$$b_{est} = \overline{S}\overline{\omega}_t + \tilde{S}\overline{\omega}_t + \overline{\omega}\tilde{\omega}_t + b_t \quad (10)$$

The scaling factor and misalignment multiplied by the variation in rotational rate $\tilde{S}\tilde{\omega}_t$ is negligible and is therefore omitted from equation 10.

The attitude errors and disadvantages associated with the thermal deformation variations are minimized by the embodiments of the present invention, as described below.

While the present invention is described with respect to a system and method of calibrating gyro sensors of a spacecraft, the present invention may be adapted to be used in various applications known in the art. The present invention may be applied in military and civilian applications. The present invention may be applied to aerospace systems, telecommunication systems, intelligent transportation systems, global positioning systems, and other systems known in the art. The present invention may be applied in all on-orbit spacecraft. The present invention may be implemented in onboard flight software or ground operational software.

In the following description, various operating parameters and components are described for one constructed embodiment. These specific parameters and components are included as examples and are not meant to be limiting.

Figure 1:
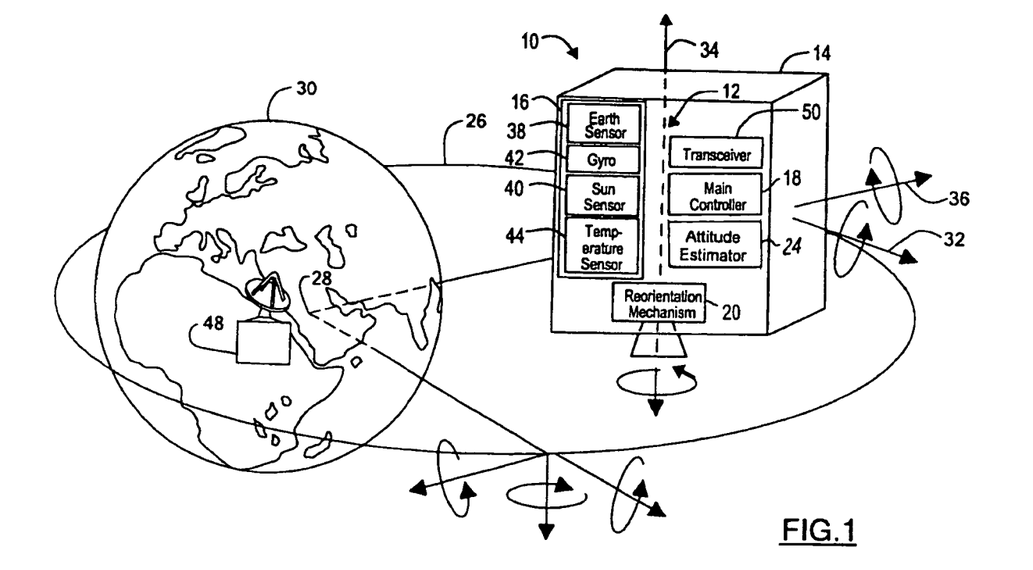
FIG. 1 is a perspective vector and block diagrammatic view of a spacecraft reorientation system using a gyro calibration system in accordance with an embodiment of the present invention.
Figure 2:
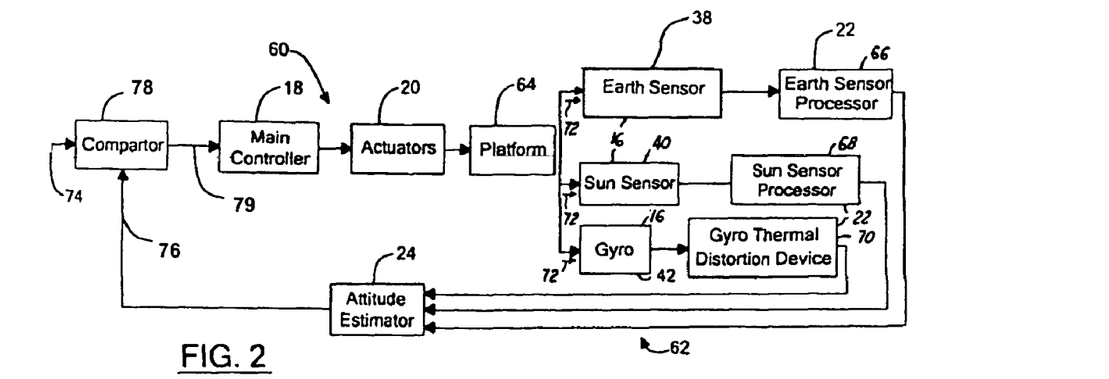
FIG. 2 is a spacecraft reorientation system signal and control flow diagram in accordance with an embodiment of the present invention.

Referring now to FIG. 1, a perspective vector and block diagrammatic view of a spacecraft attitude control system 10 using a gyro calibration system 12 for a spacecraft 14 in accordance with an embodiment of the present invention is shown. The attitude control system 10 may include multiple sensors 16 for the determination of a current or initial attitude of the spacecraft 14. The attitude control system 10 also includes a main controller 18 and a reorientation mechanism 20, which are used to adjust attitude of the spacecraft 14. The gyro calibration system 12 includes several of the sensors 16 with associated processors 22 and an attitude estimator 24, which are shown in FIG. 2. The attitude estimator 24 receives attitude information from the sensors 16 and the processors 22 and estimates a current attitude of the spacecraft 14.

The orbit of the spacecraft 14 is represented by circular orbit 26 about the center 28 of the earth 30. The spacecraft 12 has a roll axis 32, a pitch axis 34, and a yaw axis 36, where the roll axis 32 is tangent to the orbit 26, the pitch axis 34 is normal to the orbit 26, and the yaw axis 36 is directed away from Nadir.

The sensors 16 include an earth sensor 38, a sun sensor 40, a gyro 42, a temperature sensor 44, and may include other sensors known in the art for the estimation and determination of a current attitude and thermal characteristics of the spacecraft 14. The earth sensor 38 may be in the form of a beacon and may include a reflector deployment mechanism and a reflector (which are not shown). Any number of each of the sensors 16 may be utilized. The attitude of the spacecraft 14 may be determined through use of the sensors 16 or through communication signals or other various signals received from spacecraft, satellites, ground stations, such as ground station 48, or other communication stations known in the art.

The main controller 18 performs an attitude control action in response to the signals received from the attitude estimator 24 and a desired or target attitude. The target attitude may be generated onboard by the controller 18, received from another spacecraft (not shown), or received from the ground station 48 via a transceiver 50. The target attitude may be received through use of command and telemetry. The controller 18 in performing the reorientation maneuver generates a reorientation signal, which is received by the reorientation mechanism 20 and is used in the reorienting the spacecraft 14.

The reorientation mechanism 20 may be in various forms. The reorientation mechanism 20 may be in the form of multiple actuators, thrusters, a liquid apogee motor, a liquid apogee engine, a perigee motor, reaction wheels, some combination thereof, or may be in some other form known in the art. The reorientation mechanism is shown as multiple actuators in FIG. 2.

The gyro calibration system 12 includes several of the sensors 16, such as the earth sensor 38, the sun sensor 40, the gyro 42, and the temperature sensor 44. The gyro calibration system 12 operates in dual modes, which are referred to as the gyro calibration mode and the gyro compassing mode. During the gyro calibration mode, information received from the earth sensor 38 and the sun sensor 40 is used in calibration of the gyro 42. Information from the earth sensor 38, the sun sensor 40, and the gyro 42 is also used in determining spacecraft attitude during gyro calibration. During the gyro compassing mode, information received from the earth sensor 38 and the gyro 42 is used to determine the attitude of the spacecraft 14.

The controller 18, the processors 22, and the attitude estimator 24 may be microprocessor based, such as computers and have central processing units, memory (RAM and/or ROM), and associated input and output buses. The controller 18, the processors 22, and the attitude estimator 24 may be application-specific integrated circuits or may be in the form of other logic devices known in the art. The controller 18, the processors 22, and the attitude estimator 24 may each be a portion of a central control unit or may be stand-alone units, as shown. The controller 18, the processors 22, and the attitude estimator 24 may also be in the form of software modules.

Referring now to FIG. 2, a spacecraft reorientation system signal and control flow diagram in accordance with an embodiment of the present invention is shown. The diagram includes a reorientation portion 60 and an attitude estimation portion 62, which are coupled via a spacecraft bus or spacecraft platform 64. The attitude estimation portion 62 estimates the current attitude of the spacecraft 14, which is utilized by the reorientation portion 60 to adjust attitude of the spacecraft 14.

The earth sensor 38 is used to determine the roll and pitch attitudes of the spacecraft 14, the sun sensor 40 is mainly used to determine the yaw attitude of the spacecraft 14, and the gyro 42 is used to determine the roll, pitch, and yaw attitudes of the spacecraft 14. The roll and pitch information collected from the earth sensor 38 is received by the earth sensor processor 66, which determines the current roll and pitch attitudes of the spacecraft 14 according to the received information. Similarly, the roll, pitch, and yaw attitude information collected by the sun sensor 40 and gyro 42 is received by the sun sensor processor 68 and the gyro processor 70, which also determine current attitude of the spacecraft 14. Thermal deformation of the sensors 38, 40, and 42, which may not be the same as the thermal deformation of the platform 64, is accounted for and represented by arrows 72. The attitude estimator 24 processes the roll, pitch, and yaw information to estimate the current attitude of the spacecraft 14 and calibrates the gyro 42.

The target attitude and the estimated attitude are represented by arrows 74 and 76, respectively. The target attitude 74 is compared with the estimated attitude 76 by a comparator 78, which generates an attitude adjustment signal 79 in response thereto. The main controller 18 receives the attitude adjustment signal 79 and accordingly signals the reorientation mechanism 20 to adjust the attitude of the spacecraft 14.

Since the sensors 16 are mounted on the spacecraft platform 64 and thus move along with the spacecraft 14, upon adjustment of the spacecraft attitude, data collected from the sensors 16 also changes accordingly. Updated data from the sensors 16 is then utilized to estimate a subsequent spacecraft attitude.

Figure 3:
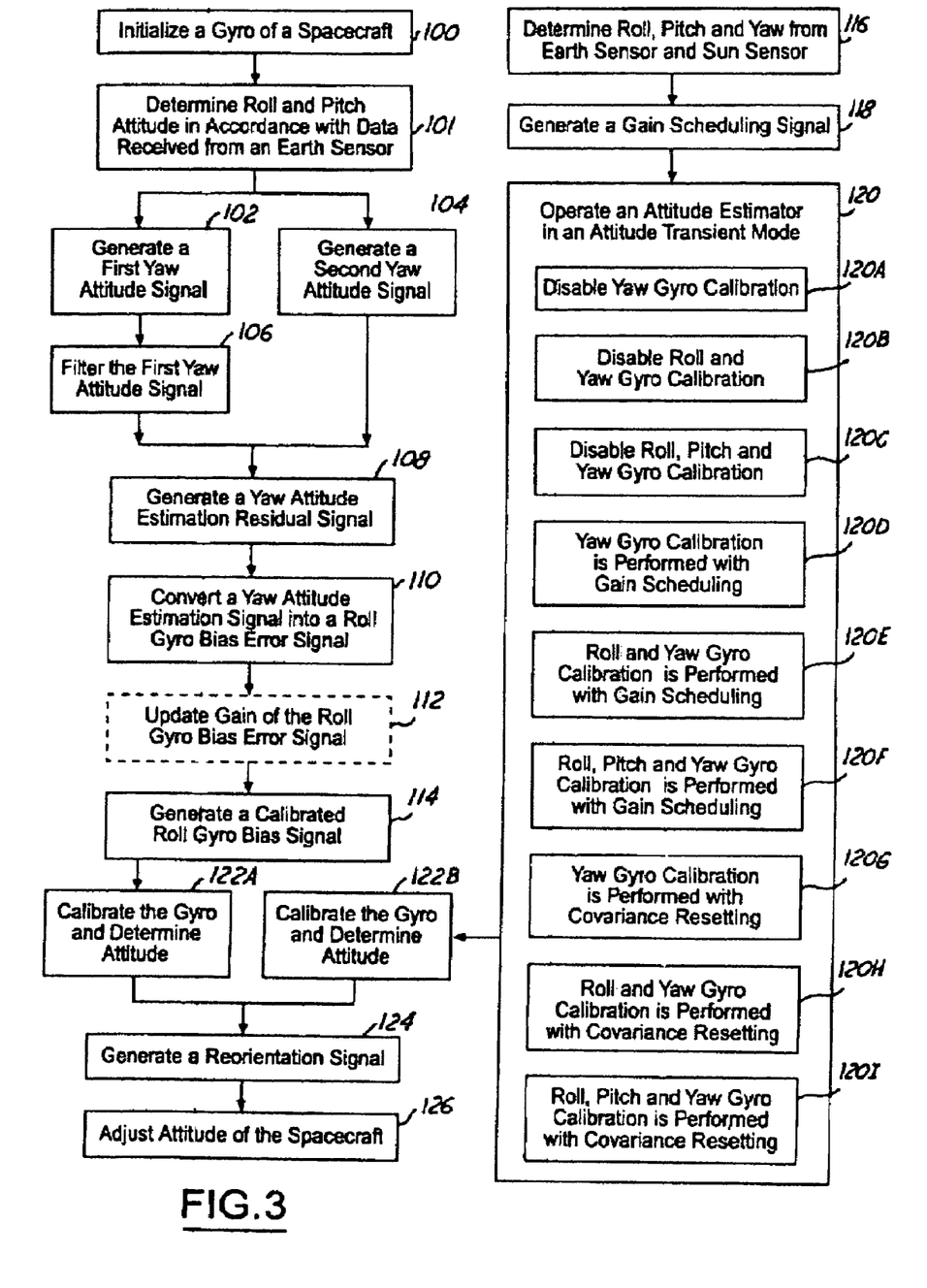
FIG. 3 is a gyro calibration signal flow diagram in accordance with an embodiment of the present invention.
Figure 4:
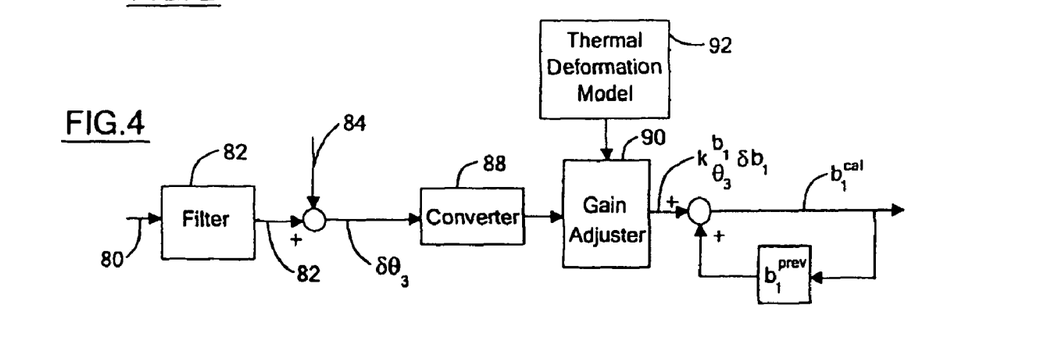
FIG. 4 is a logic flow diagram illustrating a method of attitude estimation utilizing a method of calibrating a gyro in accordance with an embodiment of the present invention.

Referring now to FIGS. 3 and 4, a logic flow diagram illustrating a method of reorienting the spacecraft 14 utilizing a method of calibrating the gyro 42, and a gyro calibration signal flow diagram are shown in accordance with an embodiment of the present invention. The method of calibrating the gyro 42 is described in steps 101–122. Steps 101–126 are performed during various gyro compassing and gyro calibration modes. Step 101 followed by steps 122A–126 are performed during the gyro compassing period. Steps 101–104 followed by steps 122A–126 are performed during the gyro calibration mode after the initial yaw transient period. Step 116 followed by steps 122B–126 are performed during the nominal gyro calibration mode (3-axis continuous gyro calibration after the yaw transient period). Steps 102–114 are performed at the beginning of the yaw transient period (approximately a few samples or less are gathered). Steps 118–120 are performed during the yaw transient period of the gyro calibration mode.

In step 100, when the gyro 42 is being initialized or used for the first time, the roll gyro bias $b_1$ is initially calibrated using the 3-axis continuous calibration technique described above.

In step 101, the earth sensor processor 66 utilizes techniques known in the art to determine roll and pitch attitude from data received from the earth sensor 38. The earth sensor data is processed continuously without interruption.

The following steps 102–114 are performed once per orbit or for approximately a few seconds per orbit when filtering is applied. The roll gyro bias $b_1$ is calibrated approximately once per orbit of the spacecraft 14 at the beginning of the yaw transient period (also the beginning of the gyro calibration period) instead of continuously. Also, yaw data is collected at the beginning of the yaw transient period when the sun first-time comes into field-of-view (FOV) of the sun sensor 40.

In step 102, the sun sensor 40 is used to measure yaw angle when the sun is in the FOV of the sun sensor 40 and when good separation angle exists between the earth sensor 38 and the sun sensor 40. This is the first time in the period of the orbit when a sun sensor measurement is used after the gyro compassing period. The sun sensor 40 generates a first yaw attitude signal, represented by arrow 80, indicative of the measured current yaw attitude of the spacecraft 14.

In step 104, the attitude estimator 24 generates a second yaw attitude estimation signal by gyro compassing, represented by arrow 84. This second yaw attitude signal by gyro compassing is also indicative of the estimated current yaw attitude of the spacecraft 14. Information contained within the second yaw attitude signal reflects thermal deformation and other errors of the gyro that occurred during gyro compassing.

In step 106, a filter 82, within the attitude estimator 24, filters the first yaw attitude signal to remove noise and short-term error. During this filtering period, multiple samples of yaw attitude signals are optimally weighted and averaged. During this filtering period, the regular yaw attitude update is disabled. In step 108, the second yaw attitude signal 84 is subtracted from the filtered first yaw attitude signal, represented by arrow 86, to generate a yaw estimation residual signal $\delta\theta_3$. The yaw estimation residual signal $\delta\theta_3$ may also be filtered.

In step 110, a converter 88, within the attitude estimator 24, converts the yaw estimation residual signal 603 into a roll gyro bias residual signal $\delta b_1$. The yaw estimation residual signal $\delta \theta_3$ may be converted through use of a fixed gain filter or a Kalman filter. The yaw estimation residual signal $\delta \theta_3$ is not used to update the yaw gyro bias. The attitude estimator 24 may utilize equation 11 to perform the stated conversion.

$$\delta b_1 = \omega_2 \sin(\delta \theta_3) \tag{11}$$

Thermal deformation during gyro compassing is accounted for in the yaw estimation residual signal $\delta \theta_3$.

In step 112, a gain adjuster 90, within the attitude estimator 24, may adjust the gain for updating roll gyro bias error signal $\delta b_1$ to further account for the thermal deformation. The gain for the update of the roll gyro bias error signal $\delta b_1$ is adjusted in response to a thermal deformation model 92 using techniques known in the art. The thermal deformation model 92 may utilize information from the temperature sensor 44, as well as other information, such as spacecraft payload power, spacecraft heater power, and sun azimuth and elevation angles to estimate the thermal deformation. Gain is determined in response to the thermal deformation. The thermal deformation model 92 may be modeled using the laws of physics or may be modeled using segment curve-fitting or sinusoidal harmonic functions known in the art.

In step 114, the attitude estimator 24 adds the roll gyro bias error signal $\delta b_1$, multiplied by the gain $k_{\theta 3}^{b1}$ determined in step 112, with a previous estimated roll gyro bias signal $b_1^{Prev}$ of a previous day to generate a calibrated roll gyro bias signal $b_1^{cal}$ for the current day. Steps 112–114 are represented by equation 12.

$$b_1^{cal} = b_1^{Prev} + k_{\theta 3}^{b1} \delta b_1 \tag{12}$$

This completes the roll gyro calibration. It only takes a few seconds for each orbit period.

In step 116, roll, pitch, and yaw attitudes of the spacecraft 14 are estimated using attitude information collected from the earth sensor 38 and sun sensor 40.

In step 118, a gain scheduling signal is generated in response to the attitude information determined in step 116. The gain scheduling signal may be determined using threshold of yaw transient error, using sun sensor azimuth and elevation measurements, using ephemeris, or other related information. Ephemeris is the positions of spacecraft and other celestial objects, such as the sun and stars, at any given moment in time. Ephemeris is used to determine sun orientation relative to the spacecraft 14 for gain scheduling, which is performed in step 120 below.

In step 120, the attitude estimator 24 operates in an attitude transient mode during the yaw transient period. The attitude estimator 24 during the attitude transient mode, which corresponds with the yaw transient period, performs gain scheduling. Gain scheduling may include disabling one or more gyro calibration procedures, varying attitude and gyro update gain, or resetting attitude and gyro bias covariance. This is described in greater detail with respect to steps 120A–I. The attitude estimator 24 selects one or more of steps 120A–I to perform. Step 120 may be performed as an alternative to steps 102–114. Step 120 may be performed throughout the duration of the gyro calibration period, and the gyro is calibrated per equation 1 with additional gain scheduling superimposed as cued by the gain scheduling signal. Steps 120A–I may be performed separately and independently from each other and as an alternative to steps 102–114.

In step 120A, yaw gyro calibration is disabled during the yaw transient period and yaw attitude is determined similar to when the attitude estimator 24 is in the gyro calibration mode. This is equivalent to attitude determination and gyro calibration per Equation 1 with $k_{\theta 3}^{b3}$ set to zero. In other words, update of the yaw gyro bias of the gyro 42 is halted. After the yaw transient period, the disabled axis is reenabled. In step 120B, roll and yaw gyro calibration is disabled. In step 120C, roll, pitch, and yaw gyro calibration is disabled.

In step 120D, yaw gyro calibration is performed with gain scheduling such that attitude update gain varies from high to normal, and yaw gyro bias update gain varies from low to nominal during the yaw transient period. The term "update" refers to correcting a gyro parameter using estimated values from the attitude estimator 24 using information gathered from the earth sensor 38 and the sun sensor 40. This is equivalent to attitude determination and gyro calibration as per Equation 1 with time-varying gains superimposed. In step 120E, roll and yaw gyro calibration is performed with gain scheduling such that the attitude update gain varies from high to normal, and the roll and yaw gyro bias update gain varies from low to nominal during the yaw transient period. In step 120F, roll, pitch, and yaw gyro calibration is performed with gain scheduling such that the attitude update gain varies from high to normal, and the roll, pitch, and yaw gyro bias update gain varies from low to nominal during the yaw transient period.

In step 120G, yaw gyro calibration is performed with attitude covariance reset to a high value and the yaw gyro bias covariance is reset to a low value at the beginning of the yaw transient period. In step 120H, roll and yaw gyro calibration is performed with the attitude covariance reset to a high value and the roll and yaw gyro bias covariance reset to a low value. In step 120I, roll, pitch, and yaw gyro calibration is performed with the attitude covariance reset to a high value and the roll, pitch, and yaw gyro bias covariance reset to a low value.

In the above steps 120D–120I, the attitude estimator 24 essentially weights the update of the attitude and the gyro parameters during the yaw transient period. The attitude and gyro parameters are updated similar to the nominal gyro calibration, except high gains are used for attitude update and very low gains are used for gyro bias update during the yaw transient period, and nominal gains are used for both attitude and gyro bias after the yaw transient period.

In step 122A, the attitude determination and gyro calibration continues during the duration of the gyro calibration period. This includes attitude errors $\delta \theta_1$, $\delta \theta_2$, and $\delta \theta_3$ and gyro bias errors $\delta b_2$ and $\delta b_3$, which is represented by equation 13. Attitude errors and gyro bias errors are determined except for the roll gyro bias $b_1$.

$$\begin{bmatrix} \delta \dot{\theta}_1 \\ \delta \dot{\theta}_2 \\ \delta \dot{\theta}_3 \\ \delta \dot{b}_1 \\ \delta \dot{b}_2 \\ \delta \dot{b}_3 \end{bmatrix} = \begin{bmatrix} -k_{\theta 1}^{\theta 1} & \omega_3 & -\omega_2 & -1 & 0 & 0 \\ -\omega_3 & -k_{\theta 2}^{\theta 2} & \omega_1 & 0 & -1 & 0 \\ \omega_2 & -\omega_1 & -k_{\theta 3}^{\theta 3} & 0 & 0 & -1 \\ 0 & 0 & 0 & 0 & 0 & 0 \\ 0 & k_{\theta 2}^{b2} & 0 & 0 & 0 & 0 \\ 0 & 0 & k_{\theta 3}^{b3} & 0 & 0 & 0 \end{bmatrix} \begin{bmatrix} \delta \theta_1 \\ \delta \theta_2 \\ \delta \theta_3 \\ \delta b_1 \\ \delta b_2 \\ \delta b_3 \end{bmatrix} + \tag{13}$$

-continued $$\begin{bmatrix} -ARW1 - k_{\theta 1}^{\theta 1} n_{\theta 1} - \sum S_{1i} \omega_i \\ -ARW3 - k_{\theta 2}^{\theta 2} n_{\theta 2} - \sum S_{2i} \omega_i \\ -ARW3 - k_{\theta 3}^{\theta 3} n_{\theta 3} - \sum S_{3i} \omega_i \\ RRW1 \\ k_{\theta 2}^{b2} n_{\theta 2} + RRW2 \\ k_{\theta 3}^{b3} n_{\theta 3} + RRW3 \end{bmatrix}$$

Note that the roll gyro bias error rate $\delta b_1$ and roll gyro bias $b_1$ are set to zero, since the element in row 4 and column 5 of the 6×6 matrix of equation 13 is set equal to zero. In step 122B, the attitude determination and gyro calibration continues during the duration of the gyro calibration period, but equation 1 is used instead of using equation 13.

In step 124, the controller 18 generates a reorientation signal in response to a difference between the target attitude 74 and the estimated attitude 76 of the spacecraft 14. In step 126, the controller 18 using the reorientation mechanism 20 adjusts the orientation of the spacecraft 14.

When the sun sensor 40 is inoperative, operating inappropriately, or is only capable of operating in coarse mode, the attitude estimator 24 is capable of daily updating the roll gyro bias using steps 102–114. The remaining portion of the attitude determination and gyro calibration is performed without use of the sun sensor 40 through use of equation 13.

The above-described steps are meant to be an illustrative example; the steps may be performed sequentially, simultaneously, synchronously or in a different order depending upon the application.

The present invention is capable of determining roll gyro bias corresponding to the thermal conditions experienced during gyro compassing. The present invention improves roll gyro bias estimation and spacecraft yaw pointing.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of calibrating a gyro of a spacecraft comprising:
   determining a yaw attitude residual from a first yaw attitude measured by attitude sensors including a sun sensor to determine absolute yaw attitude of the spacecraft when the sun comes in a field of view of the sun sensor, and subtracting from the measured first yaw attitude a second yaw attitude estimated by gyro compassing when the sun is not in a field of view of the sun sensor;
   converting the difference yaw attitude residual into a roll gyro bias residual; and
   calibrating the gyro in response to said converted roll gyro bias residual.

2. The method as in claim 1 further comprising adjusting an update gain of said roll gyro bias residual in response to a thermal model estimation.

3. The method as in claim 2 wherein adjusting an update gain of said roll gyro bias residual comprises determining said update gain via a Kalman filter.

4. The method as in claim 1 further comprising calibrating the gyro at a first periodic rate during an initialization period and calibrating the gyro at a second periodic rate upon expiration of said initialization period.

5. The method as in claim 1 further comprising summing said roll gyro bias residual with a previous roll gyro bias estimation to generate a current roll gyro bias estimation.

6. The method as in claim 1 wherein calibrating the gyro is implemented via on-board flight software.

7. A method as in claim 1 wherein calibrating the gyro is implemented via ground based operational software.

8. The method as in claim 1 wherein calibrating the gyro is performed approximately once per orbit and near a beginning portion of a gyro calibration period.

9. The method as in claim 1 wherein calibrating the gyro is performed using at least one yaw attitude signal sample per orbit near a beginning portion of a gyro calibration period.

10. The method as in claim 1 wherein said yaw attitude residual is determined by measuring a plurality of second yaw attitude signal samples per orbit near a beginning portion of a gyro calibration period.

11. The method as in claim 10 further comprising using a weighted averaging of said plurality of second yaw attitude signal samples.

12. A method of reorienting a spacecraft comprising:
    determining a first yaw attitude of the spacecraft by attitude sensors measurements including a sun sensor to determine absolute yaw attitude of the spacecraft when the sun is in a field of view of the sun sensor;
    determining a second yaw attitude of the spacecraft by gyro compassing when the sun is not in a field of view of the sun sensor;
    determining a yaw attitude residual using the difference between said first yaw attitude and said second yaw attitude;
    determining a roll gyro bias residual using said difference yaw attitude residual;
    calibrating a roll gyro using said determined roll gyro bias residual;
    estimating attitude of the spacecraft using said calibrated roll gyro; and
    reorienting the spacecraft in response to said estimated attitude.

13. A method of calibrating a gyro of a spacecraft comprising:
    determining attitude of the spacecraft measured during a yaw transient period by disabling yaw gyro calibration during the yaw transient period and:
    determining a first yaw attitude of the spacecraft by attitude sensors measurements including a sun sensor to determine absolute yaw attitude of the spacecraft when the sun is in a field of view of the sun sensor;
    determining a second yaw attitude of the spacecraft by gyro compassing when the sun is not in a field of view of the sun sensor;
    determining a yaw attitude residual using the difference between said first yaw attitude and said second yaw attitude;
    determining a roll gyro bias residual using said difference yaw attitude residual;
    calibrating a roll gyro using said determined roll gyro bias residual;
    estimating attitude of the spacecraft using said calibrated roll gyro; and gain scheduling gyro calibration and attitude determination using at least partially said spacecraft attitude determined during the yaw transient period.

14. The method as in claim 13 wherein gain scheduling comprises using a gain scheduling signal during the yaw transient period.

15. The method as in claim 14 wherein using a gain scheduling signal comprises using a yaw transient error.

16. A method as in claim 14 wherein using a gain scheduling signal comprises using a sun sensor measurement.

17. A method as in claim 14 wherein using a gain scheduling signal comprises using ephemens.

18. The method as in claim 13 wherein gain scheduling comprises disabling said gyro calibration for at least one attitude axis during an initial period when the sun comes within a field of view of an associated sun sensor.

19. The method as in claim 13 wherein gain scheduling comprises disabling said gyro calibration for at least one attitude axis during a period when a yaw attitude error is greater than a predetermined value.

20. The method as in claim 13 wherein gain scheduling comprises disabling said gyro calibration for at least one attitude axis during said yaw transient period.

21. A method as in claim 13 wherein performing gain scheduling comprises varying gyro bias update gain for at least one attitude axis from low to nominal during said yaw transient period.

22. A method as in claim 13 wherein performing gain scheduling comprises varying attitude update gain of at least one attitude axis from high to nominal during said yaw transient period.

23. A method as in claim 13 wherein gain scheduling comprises resetting attitude covariance of at least one axis to a high value.

24. A method as in claim 13 wherein gain scheduling comprises resetting gyro covariance of at least one axis to a low value.

* * * * *